United States Patent [19]

Aichinger et al.

[11] Patent Number: 5,300,269
[45] Date of Patent: Apr. 5, 1994

[54] CATALYTIC DECOMPOSITION OF DINITROGEN MONOXIDE WHICH IS PURE OR PRESENT IN GAS MIXTURES

[75] Inventors: Heinrich Aichinger, Mannheim; Karl-Heinz Boehning; Klaus Herzog, both of Ludwigshafen; Hermann Wistuba; Gert Buerger, both of Mannheim; Matthias Schwarzmann, Limburgerhof; Guenter Herrmann, Heidelberg, all of Fed. Rep. of Germany

[73] Assignee: BASF Aktiengesellschaft, Ludwigshafen, Fed. Rep. of Germany

[21] Appl. No.: 757,387

[22] Filed: Sep. 10, 1991

[30] Foreign Application Priority Data

Sep. 13, 1990 [DE] Fed. Rep. of Germany ....... 4029061

[51] Int. Cl.$^5$ .......................... B01J 8/00; G01B 17/00
[52] U.S. Cl. .................................................... 423/239.1
[58] Field of Search ............................. 423/239, 239 A

[56] References Cited

U.S. PATENT DOCUMENTS 3,804,595  4/1974  Scott ..................... 23/288 J
4,877,743 10/1989  Waugh et al. ............ 423/239

FOREIGN PATENT DOCUMENTS 3543640  6/1987  Fed. Rep. of Germany .
55-31463  3/1980  Japan .
61-45487  2/1981  Japan .
61-50650  4/1981  Japan .
61-53142  3/1986  Japan .

OTHER PUBLICATIONS

Hayes, *Canadian J. of Chemistry*, vol. 37 (1959) 583–589 The Metal–Catalyzed Decomposition of Nitrous . . . .
Gmelins Hanbuch der Anorganischem Chemi, Stickstoff, Verlag Chemie, Berlin 1936, 573–576.
Chem Abstracts, 63, 1481, (1965).
Canadian Journal of Research, No. 6, vol. 15, Sec. B, Jun. 1937, Steacie et al. pp. 237–246.

*Primary Examiner*—Gregory A. Heller
*Attorney, Agent, or Firm*—Keil & Weinkauf

[57] ABSTRACT

A catalyst for decomposing dinitrogen monoxide which is pure or present in gas mixtures comprises metallic silver applied to an alumina carrier with a BET surface area of from 5 to 25 m$^2$/g.

2 Claims, No Drawings

CATALYTIC DECOMPOSITION OF DINITROGEN MONOXIDE WHICH IS PURE OR PRESENT IN GAS MIXTURES

The present invention relates to a catalyst for the catalytic decomposition of dinitrogen monoxide which is pure or present in gas mixtures.

The catalytic decomposition of dinitrogen monoxide (laughing gas) has been known for a long time and is described in numerous publications on kinetic investigations. As long ago as 1936, Gmelins Handbuch der anorganischen Chemie, Stickstoff, 8th edition, page 573 et seq. described the decomposition of dinitrogen monoxide in a quartz vessel in the absence or presence of various catalysts such as $SiO_2$, platinum foil, titanium dioxide, platinum black, $Al_2O_3$, charcoal and thorium dioxide at various temperatures.

Industrial interest in the decomposition of dinitrogen monoxide to nitrogen and oxygen originated at NASA where the aim was to generate air for astronauts to breathe from an easily handled compound by converting ammonium nitrate into laughing gas and decomposing it into the elements (Chem. Abstracts 63, 1481, (1965)). Catalysts found to be suitable were nickel oxide, rhodium or platinum on alumina and cobalt oxide.

Another application is the removal of $N_2O$ from anesthetic gases. Thus, JP-A 54-11090 describes contacting the gas with activated carbon, which reduces the $N_2O$ content by adsorption to $\leq 50$ ppm. JP-A 61-45487 discloses the decomposition of excess $N_2O$ to $N_2$ and $O_2$ at 150° to 550° C. in the presence of catalysts composed of a mixture of elements of the iron group and of the rare earths. JP-A 55-31463 proposes catalysts containing platinum, palladium, rhodium, iridium and/or ruthenium for this purpose. JP-A 61-50650 describes the decomposition of $N_2O$ at 500° C. on alumina which contains 5% by weight of both CuO and $Cr_2O_3$. The process of JP-A 61-53142 to remove $N_2O$, NO and $N_2O_3$ from incinerator off-gases entails them being passed at >200° C. over catalysts composed of alumina which has been obtained by calcination of γ-alumina at from 1150° to 1550° C., and of oxides of cobalt, copper and manganese as catalytic components.

DE-A 35 43 640 discloses the decomposition of dinitrogen monoxide at elevated temperatures in the presence of palladium-containing catalysts.

The kinetics of the thermal catalytic decomposition of dinitrogen monoxide is reported in the papers by Steacie and Folkins in Canad. Journal of Research 15, (1937) 237–246 and by Hayes in Canadian Journal of Chemistry 37 (1959) 583–589. The catalysts added in this case are pure silver, silver/gold alloys with 1.14% by weight Au and silver/calcium alloys with 0.11 to 1.70% by weight Ca. These kinetic studies show decomposition on these silver catalysts is considerably slowed down, as it is on platinum catalysts, by the oxygen which is formed as well as by the oxygen added to the gas.

It is an object of the present invention to provide a silver-containing catalyst for decomposing dinitrogen monoxide which is pure or present in gas mixtures into the elements at elevated temperatures in the presence of this catalyst, where there is no inactivation of the catalyst even over long periods of use and where, in particular, it is possible to decompose dinitrogen monoxide not only when it is pure but also when it is mixed with other gases, e.g. air and other nitrogen oxides such as nitrogen monoxide and dioxide, into the elements without problems.

We have found that this object is achieved by applying the silver to an alumina carrier with a BET surface area of from 5 to 25 $m^2/g$.

The catalyst employed according to the invention contains from 5 to 25% by weight, preferably 10 to 20% by weight, of metallic silver, based on the weight of the carrier employed.

The novel silver-containing catalyst can be prepared in a conventional manner by applying to the carrier an aqueous solution of a reducible silver compound and, after drying, converting the latter into the metallic form. Examples of suitable reducible silver compounds are silver oxalate, formate, lactate and oxide, the latter being prepared, for example, by precipitation from silver salt solutions with alkalis (cf. DE-B 1 279 669 and DE-B 1 211 607). Silver nitrate can also be used for impregnation followed by a reduction to a metallic silver (U.S. Pat. No. 3,575,888). A process described in DE-A 21 59 346 is also suitable and entails the carrier being impregnated with the aqueous solution of one or more silver salts and of one or more organic amines, after which the solution covering the surface is evaporated off by heating, and the silver salt complexed with the amine is then reduced to metallic silver.

The said silver/amine complex salts readily undergo thermal decomposition.

Examples of such amines are primary amines which have alkyls with 1 to 8 carbon atoms, polyamines of the alkanes up to about hexane, simple alicyclic amines such as cyclohexylamine and simple heterocyclic amines such as pyrrolidine, piperidine and morpholine. Although ammonia can also be used it is less suitable industrially because of the ease of formation of explosive silver nitride.

The anion of the silver complex can be chosen from a substantial range; it is merely necessary that the anion or its decomposition products be volatile on heating. Examples which can be used are thus virtually all carboxylates, carbonate, isocyanate, cyanide, nitrite and nitrate.

Amine complexes of silver nitrate are preferred because this is the silver chemical which can be obtained at lowest cost and in purest form. It is expedient to add to the impregnation solution for complex formation at least as much amine as required for the stoichiometry of the complex of the formula

$$Ag(amino)_2NO_3$$

amino in this formula means an amino group or equivalent ligand.

After the carrier has been impregnated with the silver-amine complex it is dried, and the amine complex is decomposed to a metallic silver at from 180° to 300° C. This can be carried out in such a way that the impregnated carrier is subjected to a heat-treatment in an oven in an atmosphere which may be more or less saturated with water vapor.

In the novel process, dinitrogen monoxide or a gas mixture containing dinitrogen monoxide is passed over the supported silver catalyst at from 200° to 600° C. and thereby decomposed to nitrogen and oxygen. The space velocity can be from 1000 to 10,000 $h^{-1}$ in this process.

The novel process can be carried out in such a way that pure dinitrogen monoxide or a gas mixture or off-gas containing dinitrogen monoxide is heated in an oven or heat exchanger to the required temperature and then passed through a reaction tube packed with the silver catalyst. The gas to be reacted can also be heated in the reaction tube by interpolating a layer of inert material. The heat of reaction in the gas leaving the reactor can be used to heat the catalyst and/or the inert material.

It is possible with the novel catalyst to carry out the catalytic decomposition of dinitrogen monoxide in both the presence and the absence of relatively large amounts of nitrogen oxides (NO, $NO_2$) and/or water without a noticeable loss of catalytic activity.

The following examples illustrate the invention.

The catalysts prepared in the following examples were tested for the decomposition of dinitrogen monoxide in a reaction tube with a length of 50 cm and an internal diameter of 14 mm. The lower part of the tube was heated from outside and packed with 30 ml of spherical steatite as inert material to heat the gas containing dinitrogen monoxide to the required temperature. 20 ml of the catalyst to be tested was placed on top of the inert layer.

EXAMPLE 1

200 g of an alumina carrier (BET surface area: 8.75 $m^2/g$, water uptake: 0.49 $cm_3/g$) were impregnated with a solution of 36 g of sec-butylamine, 9 g of water and 41 g of silver nitrate, then stored at 20° C. for one hour and subsequently heated at 240° C. in a circulating air oven. The resulting catalyst contained 10.7% by weight silver.

COMPARATIVE EXAMPLE 1

A catalyst was prepared as described in Example 1 with the difference that the alumina carrier had a BET surface area of 4.6 $m^2/g$ and a water uptake of 0.29 $cm^3/g$. The finished catalyst contained 10.7% by weight metallic silver.

The results obtained with various a) gas mixtures, b) temperatures, c) space velocities and d) running times are compiled in the table which follows:

| Catalyst | Inlet gas [% by volume] | | | | Temperature [°C.] | Space Velocity $[h^{-1}]$ | Running time [h] | $N_2O$ reacted [%] |
| --- | --- | --- | --- | --- | --- | --- | --- | --- |
| | $N_2O$ | $NO_2$ | $H_2O$ | Air | | | | |
| Example 1 | 20.8 | — | — | 79.2 | 480 | 5000 | 850 | 99.8 |
| A Comp. Ex. 1 | 19.8 | — | — | 80.2 | 480 | 5000 | 48 | 99.2 |
| Comp. Ex. 1 | 19.8 | — | — | 80.2 | 480 | 5000 | 450 | 84.0 |
| Example 1 | 21.8 | 13.7 | — | 64.5 | 580 | 6800 | 850 | 99.4 |
| B Comp. Ex. 1 | 20.6 | 12.4 | — | 67.0 | 580 | 4200 | 450 | 64.8 |
| C Example 1 | 21.0 | 11.0 | 11.0 | 58.0 | 580 | 4750 | 850 | 98.1 |
| Example 1 | 21.0 | — | 10.0 | 69.0 | 480 | 5000 | 850 | 99.8 |

The results of test series A reveal that although the catalyst of Comparative Example 1 had a high initial activity this had fallen to 84% $N_2O$ reacted after a running time of only 450 hours, while the novel catalyst still had a high activity, with a 99.8% reaction, after a running time of 850 hours.

The results of test series B on the treatment of gas mixtures additionally containing $NO_2$ reveal that there had been a noticeable loss of activity of the catalyst of Comparative Example 1 after a running time of only 450 hours even though the space velocity was distinctly lower.

The results of test series C show that the novel catalyst retains its high activity on treatment of gas mixtures which contain steam in addition to $N_2O$.

EXAMPLE 2

100 g of an alumina with a BET surface area of 16 $m^2/g$ (water uptake 0.46 $cm^3/g$) were impregnated with a solution of 26.5 g of sec-butylamine, 6.4 g of water and 28.0 g of silver nitrate, stored at room temperature for one hour and then heated at 240° C. in a stream of nitrogen. The resulting catalyst contained 15.0% by weight of metallic silver.

The results on the decomposition of $N_2O$ with the catalyst of Example 2 appear in the table which follows

| Catalyst | Inlet gas [% by volume] | | | | Temperature [°C.] | Space Velocity $[h^{-1}]$ | Running time [h] | $N_2O$ reacted [%] |
| --- | --- | --- | --- | --- | --- | --- | --- | --- |
| | $N_2O$ | $NO_2$ | $H_2O$ | Air | | | | |
| Example 2 | 20.4 | — | — | 79.6 | 480 | 5000 | 750 | 99.5 |
| Example 2 | 21.0 | 11.0 | 11.0 | 57.0 | 580 | 6650 | 700 | 98.3 |

We claim:

1. In a process for decomposing dinitrogen monoxide at temperatures about 200°-600° C. into nitrogen and oxygen in the presence of a silver containing catalyst, the improvement which comprises the silver being applied to an alumina carrier which has a BET surface area of from 5 to 25 m 2/g, and wherein the catalyst has a silver content of from 5 to 25% by weight.

2. A process as claimed in claim 1, wherein the catalyst has a silver content of from 10 to 20% by weight.

* * * * *

UNITED STATES PATENT AND TRADEMARK OFFICE
CERTIFICATE OF CORRECTION

PATENT NO. : 5,300,269
DATED : April 5, 1994
INVENTOR(S) : Aichinger et al

It is certified that error appears in the above-indentified patent and that said Letters Patent is hereby corrected as shown below:

Claim 1, column 4, line 53, "about" should be --from--.

Signed and Sealed this

Thirteenth Day of September, 1994

*Attest:*

BRUCE LEHMAN

*Attesting Officer*     *Commissioner of Patents and Trademarks*